B. M. ROOF.
NON-SKID ATTACHMENT FOR MOTOR VEHICLE WHEELS.
APPLICATION FILED SEPT. 8, 1919.

1,391,694. Patented Sept. 27, 1921.

Inventor;
Benjamin M. Roof.
by
Atty.

UNITED STATES PATENT OFFICE.

BENJAMIN M. ROOF, OF LIMA, OHIO.

NON-SKID ATTACHMENT FOR MOTOR-VEHICLE WHEELS.

1,391,694.   Specification of Letters Patent.   Patented Sept. 27, 1921.

Application filed September 8, 1919. Serial No. 322,414.

*To all whom it may concern:*

Be it known that I, BENJAMIN M. ROOF, a citizen of the United States, residing at Lima, in the county of Allen and State of Ohio, have invented certain new and useful Improvements in Non-Skid Attachments for Motor-Vehicle Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to non-skid attachments for motor vehicle wheels, more particularly of the type which include a two-part clamp secured to a spoke of the wheel and a chain passing over the tire and attached to the spoke clamp member. It has for its object the making of an attachment of the type mentioned in which the ends of the chain will engage with hooks extending laterally from the clamp and be held within the hooks by guards or pins passed through the clamp and hook, and which preferably are adjustable to position from within the clamp so that when the chain is attached and the guards or pins are applied, with the clamp secured to the spoke, the guards or pins cannot become accidentally detached and the chain separated from the wheel.

To the accomplishment of the foregoing and such other objects as may hereinafter appear the invention consists in the features hereinafter particularly described and then sought to be clearly defined by the claims, reference being had to the accompanying drawing forming a part hereof, and in which—

Figure 1:
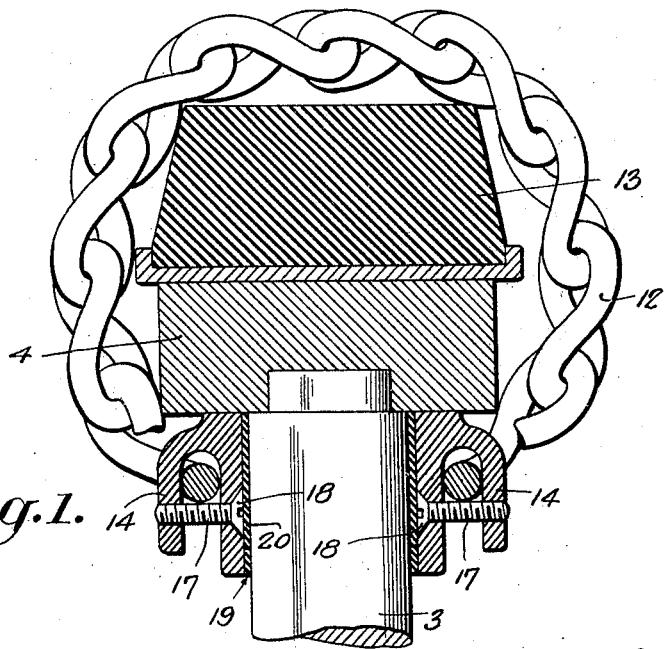
Figure 1 is a vertical section through a portion of a wheel, with the non-skid attachment applied.
Figure 2:
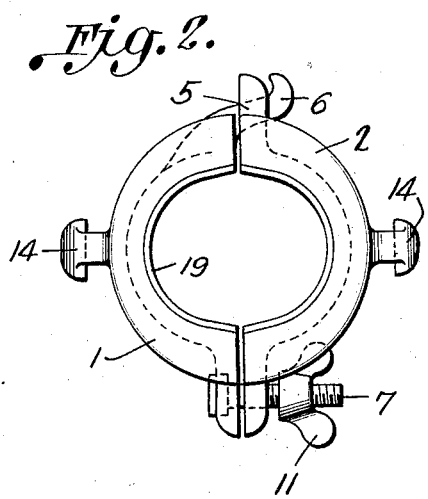
Fig. 2 is a plan view of the attachment, without the chain.
Figure 3:
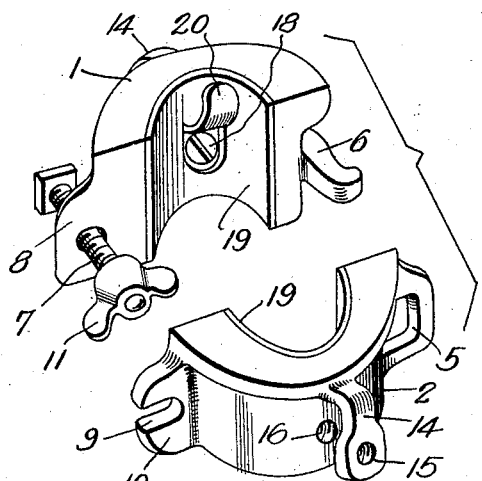
Fig. 3 is a perspective of the device, with the two parts of the spoke clamp separated, and the chain omitted.

In the drawing the non-skid attachment is illustrated as consisting of a two-part clamp comprising the members 1 and 2 shaped to fit to a spoke 3 beneath the rim 4 of a wheel and adapted to be fastened one member to the other and to the spoke by a slotted lug 5 on one member and a tongue 6 on the other member to enter the slot of the lug 5, and also by a threaded bolt 7 passing through a lug 8 on one member and adapted to enter an open-ended slot 9 in a lug 10 of the other member and have a thumb-nut 11 applied to the end of the bolt 7 so as to securely attach and secure the two-part clamp to the wheel spoke. The tongue 6 and slotted lug 5 constitute means for hinging one part to the other and permitting the ready separation of the parts when necessary; and the bolt 7 passing through the open ended slot in the lug 10 constitutes a separable fastening means opposite to the mentioned hinge connection by which the clamp may be readily attached to and detached from the wheel spoke.

For attachment of the chain 12, which passes over the wheel tire 13, to the two-part clamp, each of the two members 1 and 2 of the clamp is formed with a laterally extending hook 14 adapted to receive a link of the chain 12 and formed with a threaded eye 15 registering with a threaded opening 16 in the wall of the member of the two-part clamp so as to receive a threaded bolt or screw 17 which will straddle the space between the hook and wall of the clamp member and constitute a guard to prevent the chain link from becoming accidentally disconnected from the holding hook. The screw or bolt is introduced or placed in position from within the clamp so that when the clamp is secured to the spoke the guard cannot accidentally become unseated and thus the chain is securely held to its place. The screw head 18 of each bolt 17 is countersunk into the member of the clamp so as to be practically flush with the inner surface thereof; and the interior of the clamp is preferably provided with a lining 19 of any suitable soft or elastic material and which may have a flap 20 cut in it over the bolt head so as to permit ready access to the head of the bolt in adjusting the bolt or guard to position.

In applying the non-skid attachment, the ends of the chain are engaged with the hooks of the clamp and the guards for the chain link adjusted in place; the chain is placed over the tire; the two parts of the clamp are positioned relatively to each other so that the tongue of one member will engage the slotted lug of the other to hinge the two together; the members are then adjusted to position to grasp or encircle the spoke of the wheel; and the separable fastening is then tightened so as to secure the clamp to the spoke. The device may be readily removed when desired by releasing the clamp, removing the chain link guards, detaching the chain, putting the guards 6 back in place, and again securing the clamp to the spoke without the chain. The parts are readily assembled and disassembled whenever desired, and all parts are safeguarded under the construction specified from being lost or misplaced.

I have illustrated and described the preferred details of construction of the several parts but obvious changes or modifications may be made and essential features of the invention retained.

Having described my invention and set forth its merits what I claim is:—

1. In a non-skid device comprising a two-part member spoke clamp; a chain securing means consisting of a chain-link securing hook formed as a part of the clamp member, said hook and clamp-member having registering openings, and a guard member engaging the openings in the hook and clamp member and preventing disconnection of a chain and hook.

2. In a non-skid device comprising a separable two-part spoke clamp member; a chain securing means consisting of a chain-link securing hook extending from each of the two parts of the spoke clamp, and a movable guard adustable from within the clamp into or from operative relation to said hook to prevent disconnection of a chain and hook.

In testimony whereof I affix my signature in presence of two witnesses.

BENJAMIN M. ROOF.

Witnesses:
L. E. LUDURG,
ETHEL EMERY.